United States Patent
Stoll et al.

(10) Patent No.: US 11,482,904 B2
(45) Date of Patent: Oct. 25, 2022

(54) STATOR OF AN ELECTRIC MACHINE

(71) Applicant: Dr. Ing. h.c. F. Porsche Aktiengesellschaft, Stuttgart (DE)

(72) Inventors: Johannes Stoll, Lorch (DE); Rolf Graef, Kornwestheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 221 days.

(21) Appl. No.: 16/882,789

(22) Filed: May 26, 2020

(65) Prior Publication Data
US 2020/0373803 A1    Nov. 26, 2020

(30) Foreign Application Priority Data

May 23, 2019   (DE) ...................... 10 2019 113 785.3

(51) Int. Cl.
| | | |
|---|---|---|
| *H02K 1/12* | (2006.01) | |
| *H02K 3/48* | (2006.01) | |
| *H02K 3/12* | (2006.01) | |
| *H02K 3/24* | (2006.01) | |
| *H02K 1/18* | (2006.01) | |
| *H02K 1/16* | (2006.01) | |

(Continued)

(52) U.S. Cl.
CPC ................. *H02K 3/48* (2013.01); *H02K 1/16* (2013.01); *H02K 1/18* (2013.01); *H02K 3/12* (2013.01); *H02K 3/24* (2013.01); *H02K 3/28* (2013.01); *H02K 3/345* (2013.01)

(58) Field of Classification Search
CPC ............ H02K 1/14; H02K 1/146; H02K 1/16; H02K 1/08; H02K 1/06; H02K 1/165; H02K 2201/09; H02K 21/14; H02K 3/48; H02K 3/12; H02K 3/24; H02K 3/345; H02K 3/28; H02K 29/03

USPC ..... 310/214, 215, 216.011–216.19, 216.059, 310/216.061, 216.062, 216.064, 216.065, 310/216.071, 216.073, 216.092, 216.096, 310/216.004–216.97
See application file for complete search history.

(56) References Cited

U.S. PATENT DOCUMENTS

| | | | | |
|---|---|---|---|---|
| 1,538,196 A | * | 5/1925 | Livingston | ............... H02K 1/16 |
| | | | | 310/216.016 |
| 4,616,151 A | * | 10/1986 | Pryjmak | ................. H02K 1/26 |
| | | | | 310/216.096 |

(Continued)

FOREIGN PATENT DOCUMENTS

| | | |
|---|---|---|
| CN | 204465198 | 7/2015 |
| DE | 1 816 283 | 6/1970 |

(Continued)

OTHER PUBLICATIONS

German Search Report dated Dec. 23, 2019.

*Primary Examiner* — Maged M Almawri
(74) *Attorney, Agent, or Firm* — Gerald E. Hespos; Michael J. Porco

(57) ABSTRACT

A stator (30) of an electric machine has a stator lamination stack (20) that comprises stator laminations (1). The stator (30) has at least one stator winding with conductor bars (31) arranged in slots of the stator lamination stack (20) and fixed in the slots of the stator lamination stack (20) with the aid of a fixing device. To improve the stator (30) with regard to the service life thereof and/or to the producibility thereof, at least one clamping stator lamination (8;28) has a clamping geometry that serves as the fixing device.

14 Claims, 3 Drawing Sheets

(51) Int. Cl.
*H02K 3/34* (2006.01)
*H02K 3/28* (2006.01)

(56) References Cited

U.S. PATENT DOCUMENTS

| | | | | |
|---|---|---|---|---|
| 4,700,098 | A * | 10/1987 | Kawashima | H02K 21/22 310/156.45 |
| 4,847,526 | A * | 7/1989 | Takehara | H02K 23/40 310/154.25 |
| 4,994,700 | A * | 2/1991 | Bansal | H02K 3/48 310/60 A |
| 5,107,159 | A * | 4/1992 | Kordik | H02K 1/146 318/400.29 |
| 5,331,245 | A * | 7/1994 | Burgbacher | H02K 29/03 310/216.057 |
| 5,477,096 | A * | 12/1995 | Sakashita | H02K 1/06 310/216.016 |
| 5,778,703 | A * | 7/1998 | Imai | D06F 34/10 68/12.02 |
| 5,986,377 | A * | 11/1999 | Yamada | H02K 15/06 310/216.013 |
| 6,242,835 | B1 * | 6/2001 | Uemura | H02K 3/493 310/214 |
| 6,424,073 | B1 * | 7/2002 | Kometani | H02K 1/16 310/263 |
| 6,433,456 | B1 * | 8/2002 | Higashino | H02K 1/16 310/263 |
| 6,495,936 | B2 * | 12/2002 | Kikuchi | H02K 9/197 310/58 |
| 6,653,758 | B2 * | 11/2003 | Tsuneyoshi | H02K 9/197 310/216.014 |
| 6,774,520 | B2 * | 8/2004 | Wauke | H02K 7/09 310/40 MM |
| 6,885,127 | B1 * | 4/2005 | Higashino | H02K 1/165 310/263 |
| 6,919,663 | B2 * | 7/2005 | Iles-Klumpner | H02K 1/276 310/156.01 |
| 8,274,182 | B2 * | 9/2012 | Nakayama | H02K 41/03 310/216.096 |
| 8,847,460 | B2 * | 9/2014 | Jurkovic | H02K 29/03 310/216.096 |
| 9,331,530 | B2 * | 5/2016 | Jang | H02K 1/146 |
| 9,685,264 | B2 * | 6/2017 | Neuenschwander | H02K 15/026 |
| 10,476,321 | B2 * | 11/2019 | Li | H02K 15/026 |
| 10,547,225 | B2 * | 1/2020 | Hattori | H02K 3/345 |
| 10,574,112 | B2 * | 2/2020 | Tomonaga | H02K 3/325 |
| 10,840,749 | B2 * | 11/2020 | Chaillou | H02K 15/024 |
| 11,056,934 | B2 * | 7/2021 | Kubota | H02K 1/165 |
| 2002/0075121 | A1 * | 6/2002 | Akita | H02K 1/148 336/234 |
| 2002/0125788 | A1 | 9/2002 | Leijon et al. | |
| 2002/0163277 | A1 * | 11/2002 | Miyake | H02K 15/022 310/216.001 |
| 2004/0124733 | A1 * | 7/2004 | Yamamoto | H02K 3/522 29/596 |
| 2007/0018529 | A1 * | 1/2007 | Naitou | A61G 5/045 310/43 |
| 2007/0024148 | A1 * | 2/2007 | Maita | H02K 23/405 310/216.011 |
| 2009/0026873 | A1 * | 1/2009 | Matsuo | H02K 15/022 310/216.019 |
| 2009/0230812 | A1 * | 9/2009 | Cho | H02K 3/325 310/216.118 |
| 2010/0127593 | A1 * | 5/2010 | Qin | H02K 1/265 310/216.112 |
| 2011/0169369 | A1 * | 7/2011 | Liang | H02K 1/16 310/216.092 |
| 2016/0352159 | A1 * | 12/2016 | Li | H02K 1/146 |

FOREIGN PATENT DOCUMENTS

| | | | |
|---|---|---|---|
| DE | 32 41 410 | 12/1983 | |
| DE | 297 80 445 | 9/1999 | |
| DE | 10 2015 216 840 | 3/2017 | |
| DE | 102015216840 A1 * | 3/2017 | H02K 3/12 |
| EP | 0 489 882 | 6/1992 | |
| EP | 3361604 A1 * | 8/2018 | H02K 1/165 |
| JP | 2018133983 A * | 8/2018 | H02K 1/04 |

* cited by examiner

STATOR OF AN ELECTRIC MACHINE

CROSS REFERENCE TO RELATED APPLICATION

This application claims priority under 35 USC 119 to German Patent Appl. No. 10 2019 113 785.3 filed on May 23, 2019, the entire disclosure of which is incorporated herein by reference.

BACKGROUND

Field of the Invention

The invention relates to a stator of an electric machine, having a stator lamination stack that comprises stator laminations, and having at least one stator winding that comprises conductor bars arranged in slots of the stator lamination stack and fixed in the slots of the stator lamination stack with the aid of a fixing device. The invention also relates to a method for producing and/or machining a clamping stator lamination for such a stator.

Related Art

U.S. Pat. No. 4,994,700 discloses a dynamoelectric machine having a stator with a stator main body and at least one winding. The winding comprises conductor bars arranged in slots of the main body. Each bar is fixed in the slots by a spring that surrounds the conductor bars and has a wave-like cross section.

DE 18 16 283 discloses a device for fixing winding bars or coils in the slots of the iron body of an electric machine. The slot is closed off by at least one closure piece extending over at least a portion of the iron length. The space of the slot between the slot closure piece and the slot base that is not filled by the winding is filled by a tubular hollow body that consists of an elastic and magnetic material and in whose interior a specific controllable pressure is generated continuously by a pressure-generating system connected to one of its ends so that a specific radial pressure is exerted continuously on the bars or coil of the winding.

DE 32 41 410 A1 discloses a device for fixing the windings of electric machines. The windings consist of individual coils and are inserted into stator slots. In each case a slot closure is formed from a slot closure wedge, from a spring element and from a spring support.

EP 0 489 882 B1 discloses a method for producing the electrical insulation of the winding of an electric machine that has winding sections inserted with play into slots of the rotor or stator. A laminate that expands under heat and that contains an elastically compressible mass of highly elastic fibers is introduced between the slot surface and the winding sections.

DE 10 2015 216 840 A1 discloses a stator for an electric machine. The stator has a lamination stack with slots that extend in an axial direction of the stator. Electrically conductive bars constitute electrical windings of the stator and are arranged respectively in the slots. Each bar is insulated electrically with respect to the lamination stack by a respective electrical insulation element. The electrical insulation element is a hose formed from a thermoplastic and surrounds the bar.

It is an object of the invention to improve a stator with regard to the service life thereof and/or to the producibility thereof.

SUMMARY

A stator of an electric machine has a stator lamination stack that comprises stator laminations and at least one stator winding that comprises conductor bars arranged in slots of the stator lamination stack and fixed in the slots of the stator lamination stack with the aid of a fixing device. At least one clamping stator lamination has a clamping geometry and serves as the fixing device. This provides inter alia the advantage that no additional components are required for realizing the fixing device. In this way, the service life of the preferably directly cooled stator can be increased significantly. Furthermore, impregnation or casting with a resin can be dispensed with. In this way, an otherwise necessary manufacturing step is omitted.

The clamping geometry may have at least one clamping projection, such as a clamping lug formed directly on the clamping stator lamination.

The clamping geometry may comprise at least two clamping projections that face one another in a slot. In this way, the fixing of the conductor bars in the slot is considerably simplified.

The clamping geometry may have at least one clamping projection arranged in a slot base. The slot, on the side facing away from the slot base, may be closed off by a closure piece. The clamping projection in the slot base allows a sufficient clamping force to be realized between the slot base and the closure piece in a simple manner.

A protective layer may be formed at least partially between the clamping projection and the conductor bars of the stator winding. The protective layer may be formed by encapsulating the conductor bars with a plastic. The protective layer protects a primary insulation on the conductor bars from damage.

Direct winding cooling may be achieved by having a flow cross section for the cooling medium to remain free in the slot. The claimed clamping geometry prevents undesired relative movements of the conductor bars in relation to one another and/or movement of the conductor bars in the slot.

The stator lamination stack may comprise at least two clamping stator laminations and no clamping projection between the stator laminations. Thus, a sufficient clamping action can be achieved simply with just two clamping stator laminations. Depending on the design and size of the stator lamination stack, it is also possible for more than two, for example three or four, clamping stator laminations to be combined with a desired number of stator laminations without a clamping projection.

The clamping projection may be manufactured in the clamping stator lamination in a separation process, such as punching, as is also used for the production of conventional stator laminations. In this way, the outlay for production can be kept low.

The clamping projection on the clamping stator lamination may be deformed in the stator lamination stack such that the deformed clamping projection makes it possible for the conductor bars of the stator winding to be clamped resiliently. The deformation may be realized, for example, using a suitable deforming tool that is introduced into the packed stator lamination stack.

The invention also relates to a clamping stator lamination for a previously described stator. The clamping stator lamination is able to be handled separately.

Further advantages, features and details of the invention will emerge from the description below in which various exemplary embodiments are described in detail with reference to the drawing.

DETAILED DESCRIPTION

Figure 1:
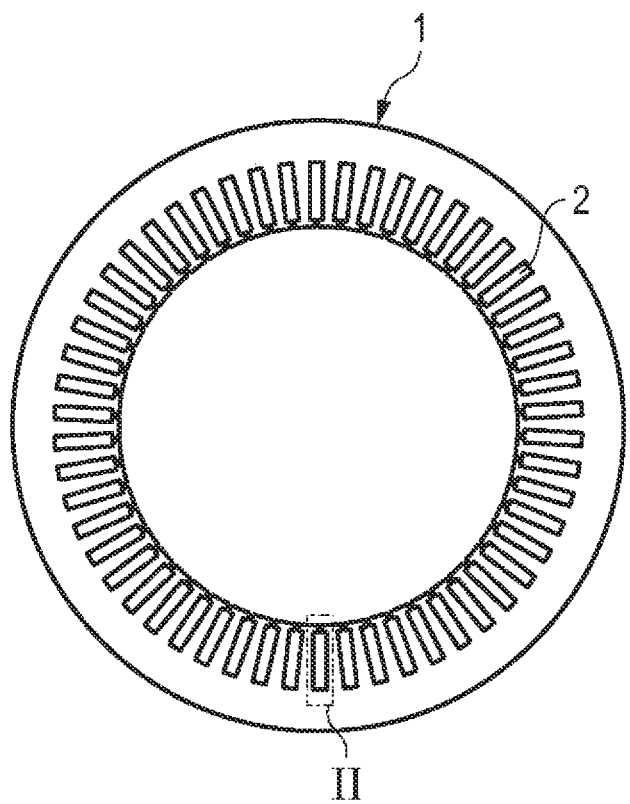
FIG. 1 is plan view of a conventional stator lamination with plural slots.
Figure 2:
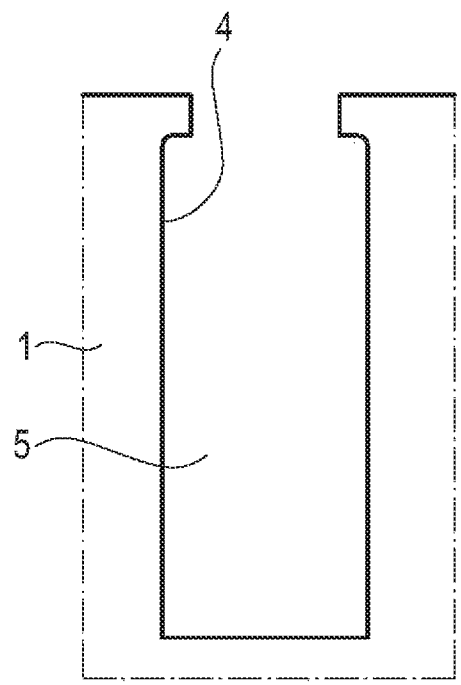
FIG. 2 is an enlarged illustration of a detail II-II from FIG. 1 with a slot.

FIG. 1 is a plan view of a classic stator lamination 1 with a total of fifty-four slots 2. FIG. 2 is an enlarged detail II from FIG. 1 with a slot 5. The slot 5 has a substantially rectangular geometry 4 that is open upwardly in FIG. 2.

Figure 3:
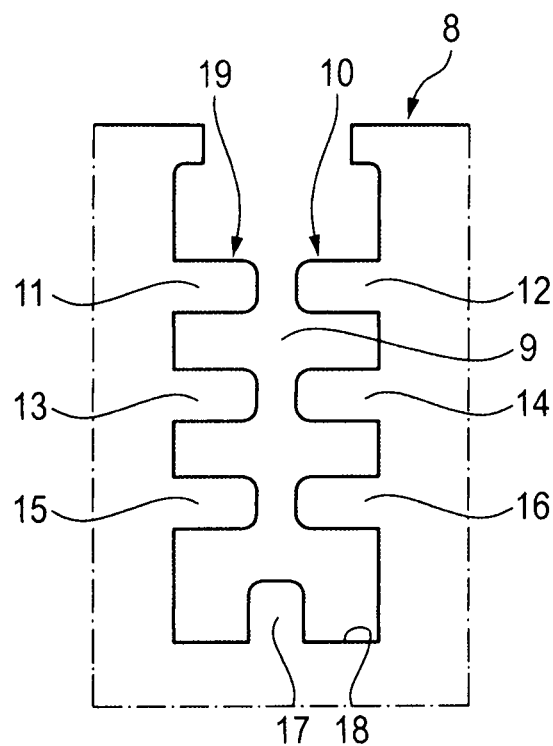
FIG. 3 is an illustration similar to FIG. 2, with a clamping geometry that serves as a fixing device.

FIG. 3 is an illustration similar to FIG. 2, and showing a clamping stator lamination 8 with a slot 9. The slot 9 is open upwardly in FIG. 3 like the slot 5 in FIG. 2. In contrast to FIG. 2, the slot 9 in FIG. 3 has a clamping geometry 10 that defines a fixing device 19. The clamping geometry 10 of the fixing device 19 has a total of seven clamping projections 11 to 17. The clamping projections 11, 12; 13, 14; 15, 16 face one another in pairs in the slot 9 while the clamping projection 17 is at the bottom in a slot base 18 of the slot 9.

Figure 4:
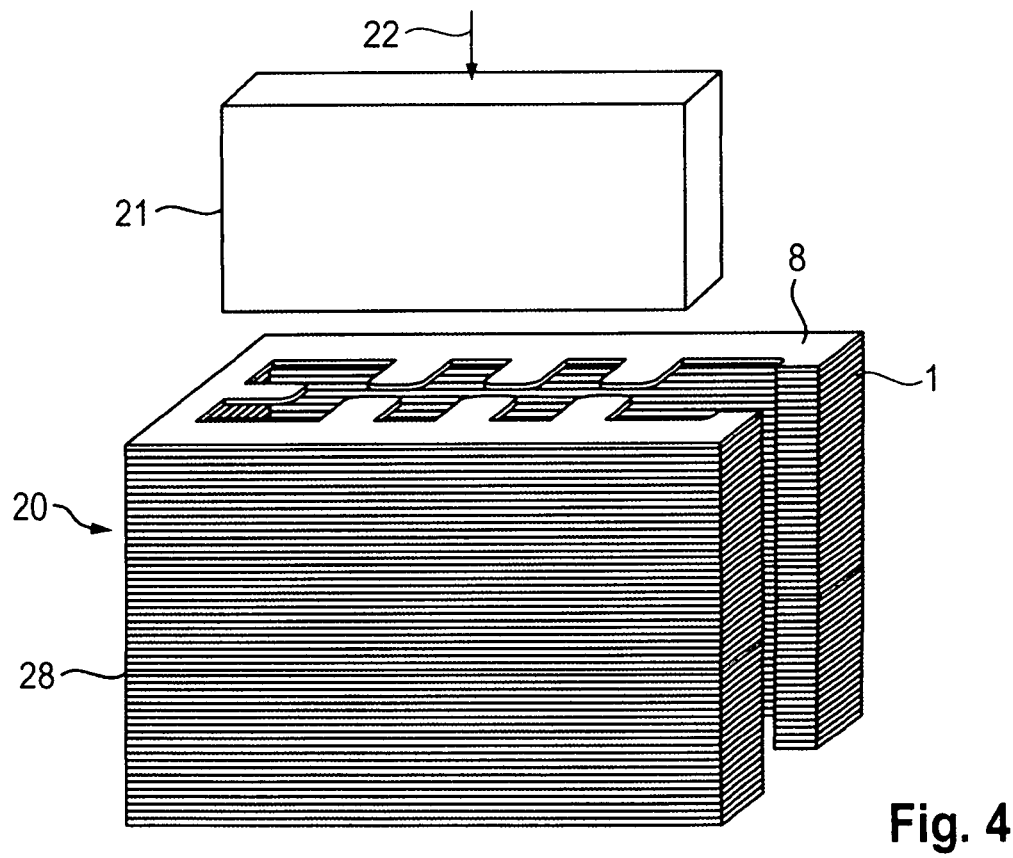
FIG. 4 is a perspective illustration of a stator lamination stack with a deforming tool illustrated in simplified form.

FIG. 4 is a perspective illustration of a stator lamination stack 20 with a multiplicity of stator laminations 1 and with two clamping stator laminations 8, 28. The clamping stator lamination 8 is arranged at the top in the stator lamination stack 20 shown in FIG. 4. The clamping stator lamination 28 is arranged in a lower half of the stator lamination stack 20 above the stator lamination stack 20.

FIG. 4 illustrates a cuboidal deforming tool 21. An arrow 22 indicates that the deforming tool 21 in FIG. 4 is moved into the stator lamination stack 20 from the top down to deform the clamping projections (not designated in more detail in FIG. 4), which preferably are produced by punching of the clamping stator laminations 8, 28.

Figure 5:
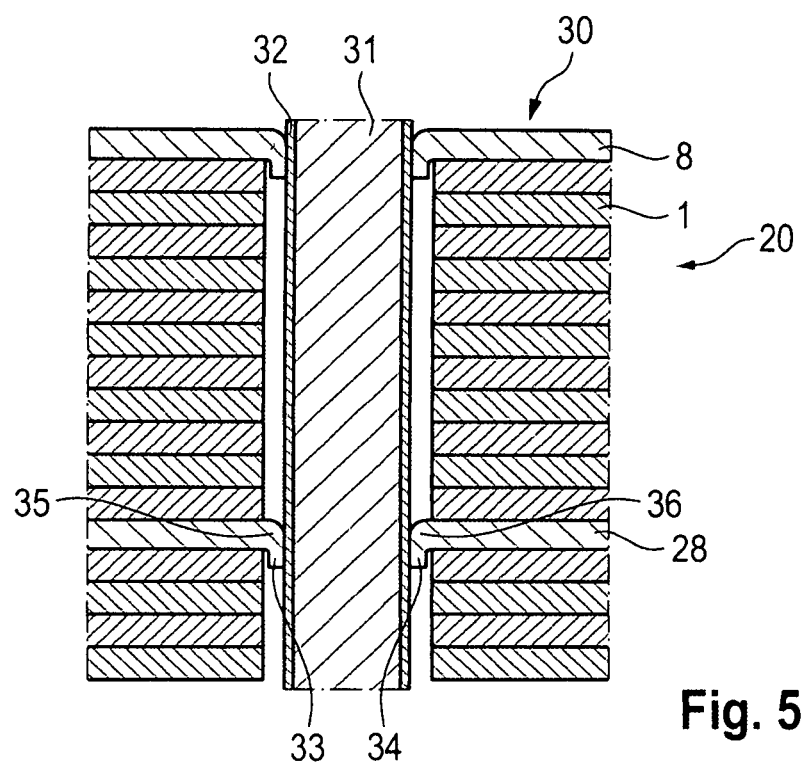
FIG. 5 is an enlarged illustration of a slot with a clamped or fixed conductor bar.

FIG. 5 shows how a conductor bar 31 of a stator 30 is fixed in the stator lamination stack 20 with the aid of the clamping stator laminations 8, 28. The conductor bar 31 is surrounded by primary insulation 32, against which deformed end regions 33, 34 of clamping projections 35, 36 of the clamping stator lamination 28 bear.

Figure 6:
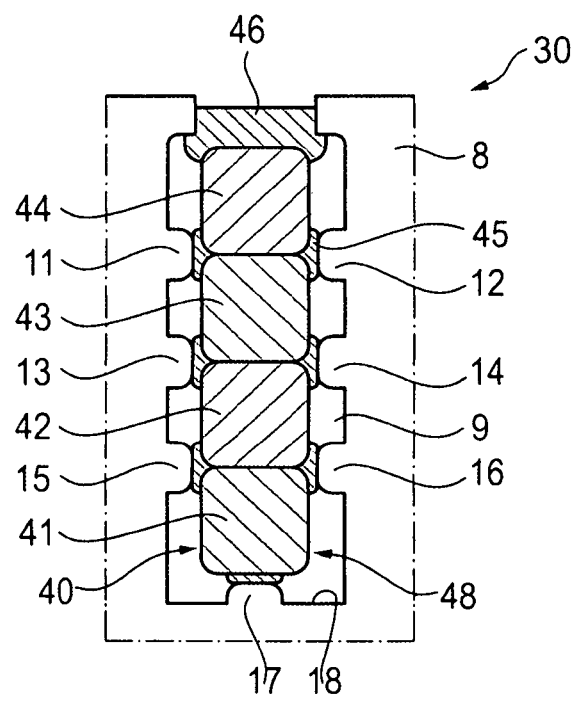
FIG. 6 is a plan view of a clamping stator lamination with a clamped stator winding.

FIG. 6 shows how, with the aid of the clamping stator lamination 8, a stator winding 40 having four conductor bars 41 to 44 is fixed in the slot 9. Between the clamping projections 11 to 17 and the stator winding 40 having the conductor bars 41 to 44, a protective layer 45 is partially arranged in each case. The protective layer 45, for example, a plastic encapsulation and protects the stator winding 40 from mechanical damage.

Intermediate spaces 48 remain free between the conductor bars 41 to 44 and the clamping stator lamination 8 and accommodate passage of a cooling medium (not illustrated in FIG. 6). The cooling medium directly cools the stator winding 40 in the slot 9. In FIG. 6, the slot 9 is closed off at the top by a closure piece 46. Via the closure piece 46, it is possible for example for the cooling medium to be fed and discharged.

LIST OF REFERENCE SIGNS

1 Stator lamination
2 Slot
4 Geometry
5 Slot
8 Clamping stator lamination
9 Slot
10 Clamping geometry
11 Clamping projection
12 Clamping projection
13 Clamping projection
14 Clamping projection
15 Clamping projection
16 Clamping projection
17 Clamping projection
18 Slot base
19 Fixing device
20 Stator lamination stack
21 Deforming tool
22 Arrow
28 Clamping stator lamination
30 Stator
31 Conductor bar
32 Primary insulation
33 End region
34 End region
35 Clamping projection
36 Clamping projection
40 Stator winding
41 Conductor bar
42 Conductor bar
43 Conductor bar
44 Conductor bar
45 Protective layer
46 Closure piece
48 Intermediate spaces

What is claimed is:

1. A stator of an electric machine, comprising a plurality of first stator laminations and a plurality of second stator laminations, the first and second stator laminations being stacked to define a stator lamination stack that with at least one of the second stator laminations being adjacent at least one of the first stator laminations, the first and second stator laminations being formed with slots and the first and second stator laminations being arranged in the stator lamination stack so that the slots in each of the stator laminations at least partly align with the slots in each other one of the stator laminations to define arrays of at least partly aligned slots in the stator lamination stack, each of the second stator laminations being formed with clamping projections projecting into the arrays of the at least partly aligned slots farther than the first stator laminations; and at least one stator winding that comprises conductor bars arranged in the respective arrays of at least partly aligned slots of the stator lamination stack, and the conductor bars being fixed in the slots of the stator lamination stack with the aid of clamping projections, wherein each of the slots has a slot opening and a slot base opposite the respective slot opening in a radial direction of the stator, the clamping projections that project into the slots of the second stator laminations comprising pairs of opposed clamping projections, with each of the pairs of opposed clamping projections being spaced in the radial direction from each of the other pairs of opposed clamping projections that project into the respective slot, wherein each of the slots that has opposed pairs of clamping projections further has a base end clamping projection projecting into the respective slot from the respective slot base.

2. The stator of claim 1, further comprising a protective layer formed at least partially between each of the clamping projections and the conductor bars of the stator winding.

3. The stator of claim 1, further comprising direct winding cooling.

4. The stator of claim 1, wherein at least two of the plurality of first stator laminations are disposed between two of the second stator laminations.

5. The stator of claim 1, wherein each of the clamping projections is bent toward at least one of the stator laminations adjacent to the stator lamination from which the respective clamping projection extends.

6. The stator of claim 1, wherein each of the clamping projections is bent to extend in a stacking direction of the stator laminations.

7. The stator of claim 6, wherein each of the clamping projections is bent toward at least one of the stator laminations adjacent to the stator lamination from which the respective clamping projection extends.

8. The stator of claim 1, wherein each of the second stator laminations has at least three clamping projections projecting into each of the slots.

9. The stator of claim 8, wherein the clamping projections comprise plural pairs of opposed clamping projections at each of the slots in each of the second stator laminations, with the clamping projections in each of the pairs of opposed stator laminations facing one another in the respective slot.

10. The stator of claim 9, wherein the clamping projections at each of the slots in each of the second stator laminations further comprises at least one clamping projection arranged in a slot base.

11. A stator of an electric machine, comprising: a stator lamination stack having stator laminations stacked on one another in a stacking direction, each of the stator laminations being formed with plural slots arranged so that each of the slots in each of the stator laminations at least partly aligns with the slots in each of the stator laminations adjacent thereto to define arrays of at least partly aligned slots extending in the stacking direction of the stator laminations, clamping projections projecting from at least two of the stator laminations in the stator lamination stack and into at least one of the slots in the respective stator lamination, the clamping projections being disposed so that each of the arrays of slots has a plurality of clamping projections spaced apart in the stacking direction; and at least one stator winding that comprises conductor bars arranged in the respective arrays of at least partly aligned slots of the stator lamination stack, and the conductor bars being fixed in the slots of the stator lamination stack with the aid of the clamping projections, wherein each of the slots has a slot opening and a slot base opposite the respective slot opening in a radial direction of the stator, the clamping projections comprising pairs of opposed clamping projections, with each of the pairs of opposed clamping projections being spaced in the radial direction from each of the other pairs of opposed clamping projections that project into the respective slot, wherein each of the slots that has opposed pairs of clamping projections further has a base end clamping projection projecting into the respective slot from the respective slot base.

12. The stator of claim 11, wherein each of the clamping projections is bent to extend in the stacking direction of the stator laminations.

13. The stator of claim 11, wherein a plurality of the stator laminations have no clamping projections.

14. The stator of claim 11, wherein a plurality of the slots have no clamping projections.

\* \* \* \* \*